(12) United States Patent
Kurabayashi et al.

(10) Patent No.: US 6,367,921 B1
(45) Date of Patent: *Apr. 9, 2002

(54) IMAGE FORMING PROCESS (75) Inventors: Yutaka Kurabayashi, Higashi Murayama; Takeo Eguchi, Yokohama, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/179,577

(22) Filed: Oct. 27, 1998

(30) Foreign Application Priority Data

Oct. 30, 1997 (JP) .............................. 9-312869
Oct. 22, 1998 (JP) ........................... 10-300664

(51) Int. Cl.⁷ .............................. B41J 2/01; C09D 11/02
(52) U.S. Cl. ................. 347/101; 106/31.86; 106/31.75; 106/31.77; 428/195
(58) Field of Search ........................... 106/31.86, 31.75, 106/31.77; 347/101, 105, 103, 100, 213; 428/195

(56) References Cited

U.S. PATENT DOCUMENTS

| 4,308,542 A | * | 12/1981 | Maekawa et al. ............. 346/1.1 |
| 5,356,464 A | | 10/1994 | Hickman et al. ......... 106/20 R |
| 5,526,031 A | | 6/1996 | Kurabayashi ................ 347/105 |
| 5,571,311 A | | 11/1996 | Belmont et al. .......... 106/20 R |
| 5,672,198 A | | 9/1997 | Belmont ..................... 106/20 R |
| 5,746,818 A | | 5/1998 | Yatake ...................... 106/31.86 |
| 5,762,695 A | | 6/1998 | Wong et al. .............. 106/31.89 |
| 5,976,233 A | * | 11/1999 | Osumi et al. ............ 106/31.86 |
| 5,984,467 A | * | 11/1999 | Bodager et al. ............. 347/101 |

* cited by examiner

*Primary Examiner*—Eugene Eickholt
(74) *Attorney, Agent, or Firm*—Fitzpatrick, Cella, Harper & Scinto (57) ABSTRACT

An image forming process capable of forming an image having high fretting resistance and water resistance by an ink-jet ejecting method using an ink containing a pigment which can be dispersed without a dispersant and smoothly transferring into a thermoplastic resin layer.

8 Claims, 6 Drawing Sheets

IMAGE FORMING PROCESS

BACKGROUND OF THE INVENTION

1. Field of the Invention

The present invention relates to an image forming process which is capable of speedily forming images of higher qualities.

2. Related Background Art

The ink-jet ejecting method that facilitates the acceleration of the recording speed, enhances resolution, lowers noise, diversifies image colors and broadens adaptability to diversified recording patterns is rapidly prevailing in recent days for recording letters, such as Chinese characters first of all, obtaining hard copies of various kinds of figure information, and for other purposes of use. Owing to compatibilities with various kinds of inks and the adaptability to diversified recording patterns, the ink-jet ejecting method is attracting attention as means for obtaining color hard copies of the output of computer terminals and so on. Further, attempts are being made to apply a multi-color ink-jet ejecting method even to the fields of multi-color printing and color-photograph printing since the multicolor ink-jet ejecting method is capable of providing images that are not inferior in quality to those formed by the ordinary multicolor printing and allows printing of a small number of copies at a cost lower than that required for the ordinary plate-making method. Though aqueous dyes have conventionally been used exclusively as color materials of inks for the ink-jet ejecting method, pigments are now usable as color materials for inks, thereby making it possible to obtain a clear image having excellent color tones.

The ink-jet ejecting method is generally classified into: a pressure oscillation type, such as an electric-charge control method and an electric-field control method; a static-electricity acceleration type that electrostatically accelerates ink with a voltage applied across electrodes opposed to each other; a pressure-pulse type, such as an on-demand type that pushes out ink with pressure pulses; and an ink-mist type that produces an ink mist with an ultrasonic oscillation; each of which forms an image by attaching drops of a liquid ink to a recording medium.

However, paper of certain high grades, coated papers, baryta papers and resin-coated papers used as substrates of photographic printing paper, transparent polymer films used as light transmissive recording media for overhead projectors, etc. are inferior in ink absorptivity, whereby unabsorbed ink may remain for a long time on the surfaces of recording media when these papers are used as recording media for the ink-jet ejecting method. In such a case, if the unabsorbed ink is brought into contact with portions of printers, operators touch the unabsorbed ink or sheets, which are discharged successively and overlap so as to rub recording surfaces, images may be fouled or the inks may flow out, thereby making it impossible to obtain clear images.

In order to record images of high quality on such recording media by the ink-jet ejecting method, it is conceivable to dispose an ink-receiving layer that has an ink absorptivity high enough to speedily absorb an ink attached to a recording medium, thereby setting it in an apparently dry condition. An ink-receiving layer that has a large number of voids can be mentioned as an example of an ink-receiving layer having an ink absorptivity high enough to meet this requirement.

In order to form an ink receiving layer which has a high ink absorptivity, it is carried out, for example, to use thermoplastic resin particles as a material of an ink receiving layer which absorbs and holds an ink into voids formed among the particles. When the voids formed among the particles have a size smaller than a color material contained in the ink, however, the color material may remain on a recording medium, thereby posing a problem in fretting resistance of a formed image. An image formed with an ink which uses a dye as a color material poses no serious problem in the fretting resistance or water resistance. This fact is considered due to a fact that particles of the dye dissolved in the ink are sufficiently small and can easily penetrate voids in an ink receiving layer of a recording medium. In case of an image formed with an ink which contains a pigment larger than the dye, in contrast, its fretting resistance and water resistance are influenced by a size of the pigment and a size of the voids. In other words, the ink-jet ejecting method which uses an ink containing a pigment allows a quality of an image to be influenced by matching between an ink and a recording medium, or is hardly capable of stably forming images of high qualities.

SUMMARY OF THE INVENTION

The present invention has been achieved in view of the aforementioned background and an object of the present invention is to provide an image forming process which makes it possible to stably obtain an image of higher quality by utilizing an ink-jet ejecting method which uses an ink containing a pigment.

According to one aspect of the present invention, there is provided an image forming process comprising steps of:

(i) providing a recording medium having a substrate and a thermoplastic resin layer which constitutes an outermost layer of the recording medium;

(ii) ejecting an aqueous ink containing a pigment which can be dispersed into water without a dispersing agent toward an outside surface of the thermoplastic resin layer by an ink-jet ejecting method, thereby attaching the pigment to the outside surface of the thermoplastic resin layer; and (iii) transferring the pigment from the outside surface of the thermoplastic resin layer into the thermoplastic resin layer.

The inventors made various examinations to accomplish the object described above and found this fact: a pigment may not transfer smoothly into a thermoplastic resin layer when a general pigment ink which contains a pigment and a dispersing agent therefor is attached to a recording medium having a surface composed of a thermoplastic resin layer, and then the recording medium is heated, whereas an image of an extremely high quality can be formed by similar procedures when carbon black as a pigment which can be dispersed into water without a dispersing agent (hereinafter referred to in short as a self-dispersion type carbon black) is selected as a color material and an ink to which no dispersing agent is added is used. On the basis of this knowledge, the inventors considered that the dispersing agent contained in the general pigment ink governs the mutual solubility between a pigment and a thermoplastic resin and the mobility of a pigment on a surface of a thermoplastic resin layer into the thermoplastic resin layer, thereby achieving the present invention.

The image forming process according to the embodiment of the present invention allows a pigment, which is attached to a surface of a thermoplastic resin layer by an ink-jet ejecting method, to transfer into the thermoplastic resin layer so that it is covered with the thermoplastic resin, thereby being capable of forming an image of an extremely high quality, which is excellent in fretting resistance, water resistance and durability. Further, the image forming process according to the present invention achieves a quality of an image which being not influenced by the relationship between the size of a pigment and the size of pores in a surface of a recording medium, thereby making it possible to form images of a uniform quality.

BRIEF DESCRIPTION OF THE DRAWINGS

FIGS. 9A and 9B are schematic sectional views of recording media to be used in the embodiment of the present invention: FIG. 9A showing a recording medium having a composition wherein a thermoplastic resin layer is formed on a substrate, and FIG. 9B showing a recording medium having a composition wherein a substrate, an ink receiving layer and a thermoplastic resin layer are laminated;

DETAILED DESCRIPTION OF THE PREFERRED EMBODIMENT

Now, the present invention will be described in more detail with reference to a preferable embodiment of the present invention.

Figure 9A:
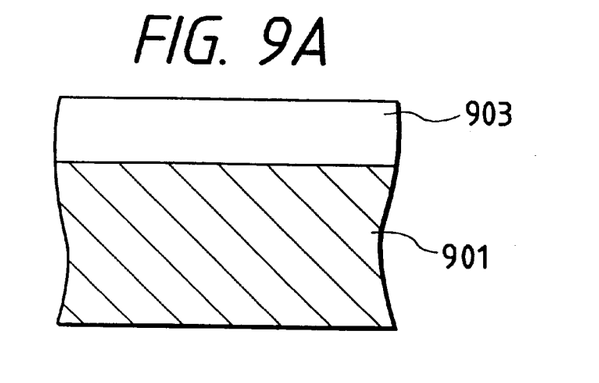
Figure 9B:
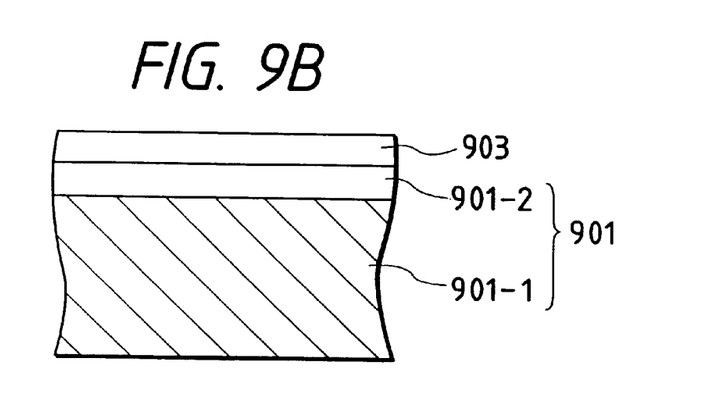

With reference to FIGS. 9A and 9B, a description will be provided of a recording medium which is usable for the image forming process according to the present invention and has a thermoplastic resin layer on a substrate.

As a substrate 901 for a recording medium to be used for the image forming process according to the present invention, there can be mentioned a transparent film which is made of a material such as polyester, polysulfone, polyvinyl chloride, polycarbonate, polystyrene, polymethylmethacrylate, cellulose acetate, polyethylene, polypropylene and the like, a white film which can be obtained by charging a white pigment or producing fine bubbles in the material mentioned above or an opaque sheet like material such as a general paper, coated paper, a baryta, a resin-coated paper, a metal foil and the like.

Usable as the white pigment to be charged in a paper or a film is, for example, a substance such as titanium oxide, calcium sulfate, calcium carbonate, silica, clay or talc which is ordinarily used as a charging material, a pigment for paints and kneading material. Though a thickness of the substrate is not limitative for the present invention, it is general to use a substrate of 10 $\mu$m to 300 $\mu$m thick.

Usable as the substrate 901 is a substrate 901-1 which has an ink receiving layer 901-2 for improving ink absorptivity disposed on a surface thereof as shown in FIG. 9B. Usable as a material to compose the ink receiving layer 901-2 is, for example, a water-soluble or hydrophilic polymer which can receive the so-called aqueous ink and exhibits solubility or affinity to the aqueous ink. Examples of such a polymer are polyvinyl alcohol, polyurethane, carboxymethyl cellulose, polyester, polyacrylate (ester), hydroxyethyl cellulose, melamine resin or synthetic resins of modifications thereof and natural resins such as albumin, gelatin, casein, starch, cationized starch, gum arabic, and sodium alginate. It is allowed to use a plurality of these substances at the same time.

In order to form the ink receptor layer 901-2, a coating liquid is prepared by dissolving or dispersing such a polymer in water, an alcohol, a polyhydric alcohol or another adequate organic solvent. The substrate 901 shown in FIG. 9B can be obtained by coating a surface of the substrate 901-1 with the prepared coating liquid, for example, by the roll coater method, blade coater method, air knife coater method, gate roll coater method, bar coater method, size press method, spray coating method, photogravure coater method, curtain coater method or the like, and then drying the coating liquid in a hot-air drying furnace, a heated drum or the like.

The ink receiving layer 901-2 may contain filler additives. Examples of the filler are silica, alumina, aluminium silicate, magnesium silicate, basic magnesium carbonate, talc, clay, hydrotalcite, calcium carbonate, titanium oxide, zinc oxide and plastic pigments such as polyethylene, polystyrene, polyacrylate and the like. The ink receptor layer may contain one, two or more fillers selected from among these substances. Further, it is possible to optionally add other additives, for example, surface-active agents, dye sealing agents (water resistants), anti-foaming agents, anti-oxidizing agent, fluorescent brightening agents, ultraviolet absorbers, dispersants, viscosity modifiers, pH adjusting agents, mildewproofing agents and plasticizers.

As examples of substrates or recording media which have such ink receiving layers, there can be mentioned coated papers manufactured for the ink-jet ejecting method, transparent films for OHP and general glossy papers. CA-101, HG-201 and CF-301 (all manufactured by Canon Inc.) are examples of such recording media which are commercially available.

A thermoplastic resin layer 903 is formed on at least one of surfaces of a substrate described above. In order to improve adhesion of a thermoplastic resin to the surface of the substrate, it may be subjected to a corona discharge treatment, a sandblasting treatment, a flame treatment or other general adhesion improving treatment or an undercoat layer may be disposed on a surface of the substrate on which the thermoplastic resin layer is to be disposed. As a material which is selectable to form the undercoat layer, there can be mentioned, for example, a resin such as gelatin, nitrocellulose and the like.

Now, a description will be provided of the thermoplastic resin layer. In order to impart sufficiently excellent fretting resistance and water resistance to formed images, it is preferable to use a material that allows at least a portion of a thermoplastic resin layer to be softened or melted within a range where it does not influence a self-holding property of a recording medium when the recording medium is heated, whereby a pigment adhering to an outside surface of the thermoplastic resin layer is taken into the thermoplastic resin layer. Though differently dependent on heating temperatures to be set, concrete materials of the thermoplastic resin layers are, for example, aromatic compounds of poly-monovinylidene (for example, polystyrene, polymethyl sulfone, polymetoxy styrene and polychrolostyrene), polyolefin, poly-halo-olefin (for example, polyvinyl chloride, polyvinyl cyclohexane, polyethylene, polypropylene and polyvinylidene chloride), esters of $\alpha$, $\beta$-ethylenic unsaturated acid (ester of polymethacrylate, ester of polychloracrylate, ester of polymethylmethacrylate) and various kinds of copolymers containing monomers thereof. A thermoplastic resin layer which contains these materials can be formed, for example, by dissolving the materials mentioned above in an adequate solvent and coating a substrate with a solution thus prepared.

Figure 10:
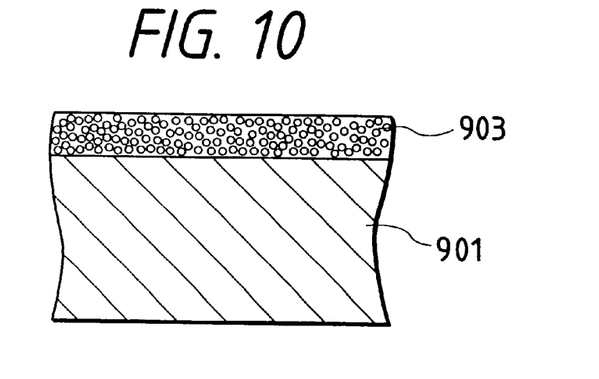
FIG. 10 shows a composition wherein a thermoplastic resin layer is configured as a layer which contains thermoplastic resin particles.

It is preferable to compose the thermoplastic resin layer so as to contain resin particles made of the materials mentioned above as shown in FIG. 10. The reason is that the thermoplastic resin layer has pores on an outside surface thereof to which an ink supplied by the ink-jet ejecting method adheres easily.

As the thermoplastic resin which is used in a condition of fine particles for the image forming process according to the present invention, it is preferable to select plastic pigment which is in the so-called slurry condition prepared by suspending and polymerizing one or more kinds of vinylic monomers. The plastic pigment is usable in a dried condition, or may be fine powders obtained by crushing a solid-state plastic made of the materials mentioned above or powders which are formed as fine particles of the materials. It is preferable to use fine particles of the thermoplastic resin which have a mean particle diameter of 0.05 to 20 $\mu$m, or more preferable to use fine particles which have a mean particle diameter of 0.1 to 12 $\mu$m.

As a method to form a thermoplastic resin layer which contains the fine particles of the thermoplastic resin, there can be mentioned a method which comprises preparing a coating liquid by dispersing particles of the thermoplastic resin in an adhesive agent and coating a substrate with the liquid. To prepare the coating liquid, it is possible to use as the adhesive agent, for example, starches such as an oxidized starch, an etherified starch and an esterified starch and dextrin, cellulose derivatives such as carboxymethyl cellulose and hydroxyethyl cellulose, casein, gelatin, soybean protein, polyvinyl alcohol and derivatives thereof, maleic acid anhydride resin, general styrene-butadiene copolymer, conjugate diene polymer latices such as methyl methacrylate-butadiene copolymer, acrylic polymer latices such as polymers and copolymers of ester acrylate and ester methacrylate, vinylic polymer latices such as a copolymer of ethylene acetate, polymer latices of these kinds of polymers which have functional groups modified by monomers containing functional groups such as carboxyl group and thermoset resins such as melamine resin and urea resin. Further, it is possible to additionally use starches and polyvinyl alcohol which are cationically denaturated as well as cationic resins which contain nitrogen.

If necessary, the coating liquid may preliminarily be blended, for example, with adequate amounts of a pigment dispersant, a viscosity builder, a fluidity modifier, an antifoam agent, a foam inhibitor, a mold-releasing agent, a coloring agent and the like. However, it is preferable to use materials which do not influence a mobility of the pigment into the thermoplastic resin layer in amounts within ranges free from influences on the precipitation of the pigment.

To form the thermoplastic resin layer by applying the coating liquid which has the composition described above to the substrate, it is possible to use any of coaters, for example, a blade coater, an air knife coater, a roll coater, a brush coater, a curtain coater, a champlex coater, a bar coater and a photogravure coater which is generally used for manufacturing papers coated with pigments (coated papers).

At a step to form the thermoplastic resin layer, the coating liquid may be applied to the substrate in a required amount at a time or repeatedly two or more times so as to obtain a desired thickness. Taking into consideration a mobility of a pigment and image qualities (fretting resistance, etc.) to be finally obtained, it is preferable that the thermoplastic resin layer has a thickness of 1 to 200 $\mu$m or 3 to 50 $\mu$m in particular.

After the coating liquid is applied to the substrate as described above, the thermoplastic resin layer may be formed by drying. For drying the coating liquid applied to the substrate, it is possible to use a general heating method which uses, for example, a gas heater, an electric heater, a steam-heated oven or a hot-air heater. During heating by the method described above, it is preferable to limit a temperature of a top surface below a melting point of the thermoplastic resin or the fine particles of the thermoplastic resin used as a material of the thermoplastic resin layer. Such limitation of the drying temperature for the thermoplastic resin layer at the drying step makes it possible to prevent an ink absorptivity from being lowered due to filming of the thermoplastic resin layer or densification of the film.

After allowing an ink to adhere to an outside surface of the thermoplastic resin layer of a recording medium by the ink-jet ejecting method, the thermoplastic resin layer is heated so as to be softened or partially melted, thereby allowing the ink to settle into the thermoplastic resin layer, thereby allowing an ink to precipitate into the thermoplastic resin layer. As a heating method, there can be mentioned a method to heat a surface of the thermoplastic resin layer by bringing it into pressure contact with a heated metal plate or a metal roll, irradiating it with heat radiation from an electric heater or an infrared lamp, or exposing it to a hot blast. It is effective for obtaining a smooth surface to bring a transparent and smooth plastic film into contact with the outside surface of the thermoplastic resin layer and bond it by heating at the stage to heat the thermoplastic resin layer with a hot blast or heat radiation. Further, it is allowed to interpose a thermally fusible plastic powder or plastic film between the thermoplastic resin layer and the film to be placed on the surface of the thermoplastic resin layer before melting the thermoplastic resin layer. By configuring the surface which is to be heated and brought into pressure contact with the outside surface of the thermoplastic resin layer as a mirror surface, coarse surface or a surface having special patterns curved thereon, it is possible to obtain desired lustre or form desired irregularities on the outside surface after the heating and melting.

For preventing degradation of the thermoplastic resin layer and enhancing weather resistance of color materials composing images formed by the ink-jet ejecting method, it is desirable to prepare the thermoplastic resin layer in a condition where it contains, for example, an ultraviolet-absorbing agent, an anti-oxidizing agent, a mold-releasing agent and/or a stabilizer which are ordinarily used for thermoplastic resins.

As an aqueous ink for the image forming method according to the present invention, it is preferable to use an ink containing a pigment as a coloring material which can be dispersed in water without a dispersant. An aqueous medium in which a pigment is dispersed without using a dispersant such as an aqueous polymer is usable as an ink for ink-jet ejecting method. By applying such an ink to the outside surface of the thermoplastic resin layer of the recording medium described above by the ink-jet ejecting method and then heating the recording medium, almost all of the pigment on the recording medium which serves for forming an image is allowed to transfer into the thermoplastic resin layer. In other words, almost all of the pigment can be covered with a film of the thermoplastic resin. This merit is considered due to a fact that the transfer of the pigment adhering to the outside surface of the thermoplastic resin layer into the thermoplastic resin layer is not hindered by a dispersant (for example, aqueous polymer). Further, an image formed in this way is clearer and has a more excellent color tone as characteristics of an image formed with the pigment.

As a pigment which can be dispersed in water without a dispersant, it is preferable to select a pigment which contains, as a color material, a self-dispersion type carbon black whose surface is combined with at least one hydrophilic group by way of another atomic group. Unlike the conventional pigment inks, an ink which uses such a carbon black as a color material makes it unnecessary to add a dispersant for dispersing a carbon black. When a dispersibility in an ink is taken into consideration, it is preferable to select as the self-dispersion type carbon black one which is anionically or cationinally charged.

As carbon blacks which are anionically charged, there can be mentioned those which have surfaces combined, by way of other atomic groups, with hydrophilic groups, for example, —COOM, —SO$_3$M, —PO$_3$HM, —PO$_3$M$_2$, —SO$_2$NH$_2$, and —SO$_2$NHCOR (wherein M is a hydrogen atom, an alkali metal, an ammonium or an organic ammonium and R is an alkyl group having 1 to 12 carbon atoms, a substituted or unsubstituted phenyl group, or a substituted or unsubstituted naphthyl group). Out of these carbon blacks, self-dispersion type carbon blacks which have surfaces combined with at least either of —COOM and —SO$_3$M by way of another atomic group and are anionically charged exhibit favorable dispersibility in inks and are used preferably in particular. Lithium, sodium or potassium can be mentioned as the alkali metal in the hydrophilic group which is represented by the chemical symbol M, and mono-, di- and trimethyl ammonium, mono-, di-, and triethyl ammonium and mono-, di- and trimethanol ammonium can be mentioned as the organic ammonium in the hydrophilic group which is represented by the chemical symbol M.

As a method for forming a self-dispersion type carbon black which is anionically charged, there can be mentioned, for example, a method which combines —Ar—COONa group (wherein Ar represents an allyl group) with a surface of a carbon black by bringing nitrous acid into reaction with an NH$_2$—Ar—COONa group so as to produce diazonium salt.

As a method for forming a self-dispersion type carbon black which has a surface combined with —COOM, there can be mentioned, for example, a method which enhances a degree of an oxidation of commercially available acidic carbon black.

An acidic carbon black can be obtained by adequately oxidizing a coloring carbon black such as furnace black or channel black by an oxidation method which uses an ordinary oxidizing agents (for example, nitric acid, ozone, hydrogen peroxide, nitrogen oxide) or a surface improving method such as plasma treatment. Such acidic carbon blacks are placed on the market under trade names of "MA100", "2400B" and "MA8" by Mitsubishi Chemical Industries Ltd. and a trade name of "Color Black FW200" by Degusa Co.

When such an acidic carbon black is to be used for the image forming process according to the present invention, it is further oxidized to obtain an acidic carbon black which is oxidized to a higher degree than the ordinary carbon black, and its surface quality is improved, for example, with a hypohalite. Though sodium hypochlorite and potassium hypochlorite can be mentioned as hypohalites which are usable for this oxidation or improvement of surface quality, it is preferable to use sodium hypochlorite from a viewpoint of a reactivity.

A method to oxidize an acidic carbon black will be described below. To oxidize an acidic carbon black, it is general to put the acidic carbon black and a hypohalite (for example, sodium hypochlorite) at an effective halogen concentration of 10 to 30% by weight of a carbon black are put into an adequate amount of water, and agitate the water for at least 5 hours, preferably approximately 10 to 15 hours at 50° C. or higher, preferably 95 to 105° C. A carbon black thus obtained contains surface active hydrogen, for example, at 1.5 mmol/g or higher.

Then, a product is filtered and washed with ion-exchanged water to remove by-product salts. Further, the product is purified and concentrated using a separating membrane such as a reverse osmosis membrane or an ultrafilter membrane which has a pore diameter of 0.01 μm or smaller. The concentration is generally carried out so as to obtain a thick pigment dispersion liquid which has a carbon black content on the order of 10 to 30% by weight of water. A pigment dispersion liquid thus obtained contains no dispersant and is usable with no additional treatment as an aqueous pigment ink for the ink-jet ejecting method.

Alternately, the concentrated pigment dispersion liquid may be further dried to prepare a powdery pigment or further concentrated to prepare a pigment paste which contains the pigment on the order of 50% by weight. By dispersing the powdery pigment or the pigment paste in an aqueous solvent subsequently and adjusting them at a desired concentration, it is possible to obtain an aqueous pigment ink which is usable for the ink-jet ejecting method.

(Cationic hydrophilic group)

As a cationically charged carbon black, there can be mentioned a carbon black which has a surface combined, for example, with at least one of quaternary ammonium groups listed below:

As a method for forming a self-dispersion type carbon black which is combined with a hydrophilic group described above and cationically charged, there can be mentioned a method which treats a carbon black with 3-amino-N-ethyl pyridium bromide to combine an N-ethyl pyridyl group having, for example, a composition shown below:

A carbon black which is anionically or cationically charged by introducing a hydrophilic group into a surface of the carbon black as described above has an excellent water dispersibility owing to repulsion of ions, thereby maintaining a stable dispersed condition even when it is contained in an aqueous ink without adding a dispersant or the like.

Each of the hydrophilic groups mentioned above may be combined directly with a surface of a carbon black. Alternately, another atomic groups may be interposed between the surface of the carbon black and the hydrophilic group so that the hydrophilic group is combined indirectly with the surface of the carbon black. As the other atomic group, there can be mentioned, for example, a straight-chain or branched-chain alkylene group having 1 to 12 carbon atoms, a substituted or unsubstituted phenylene group or a substituted or unsubstituted naphthylene group. As a substituted phenylene group and a substituted naphthylene group, there can be mentioned, for example, a straight-chain or branched-chain alkylene group having 1 to 6 carbon atoms. Further, concrete examples of a combination the other atomic group and the hydrophilic group are —$C_2H_4$—COOM, —Ph—$SO_3$M, —Ph—COOM and so on (wherein the chemical symbol Ph represents a phenyl group).

It is possible to adequately use two or more kinds selected from among the self-dispersion type carbon blacks as color materials for an ink. It is preferable to add the self-dispersion type carbon blacks at a ratio by weight of 0.1 to 15% of a total weight of an ink or within a range from 1 to 10% by weight in particular of a total weight of an ink. When the self-dispersion type carbon blacks are added at a ratio within this range, the carbon blacks are capable of maintaining a sufficiently dispersed conditions in an ink. It is possible to add a dye as a color material for adjusting a color tone of an ink according to the present invention.

When the oxidized carbon black described above is oxidized for use as a pigment which can be dispersed in water without a dispersant, it is preferable to use, for example, a dye which has an anionic group as a solubilization group.

Water-soluble acidic dyes, direct dyes and reactive dyes which are listed in the Color Index can be used with no special limitation as water-soluble dyes having anionic groups. Further, it is possible to use dyes which are not listed in the Color Index so far as they have anionic groups, for example, a sulfone group, a carboxyl group or the like. Needless to say, the water-soluble dyes include those which have solubilities varying dependently on pH levels. These dyes are used in inks at 1 to 10% by weight, preferably within a range from 1 to 5% by weight.

In case of an aqueous pigment ink which uses no dispersant as described above, it is preferable to adjust the ink as a whole in a neutral or alkaline condition. Such an adjustment is preferable to prepare an aqueous ink which is more excellent in long-term shelf stability. When durabilities of various members used in an ink-jet recorder are taken into consideration, it is desirable to adjust the aqueous ink within range from pH 7 to 10.

As pH adjusting agents to be used for this purpose, there can be mentioned, for example, organic amines such as diethanolamine, triethanolamine and the like, inorganic alkaline agents such as hydroxides of alkali metals such as sodium hydroxide, lithium hydroxide, potassium hydroxide and the like, organic acids and mineral acids.

An aqueous medium to be used in an ink is water or a mixture solvent consisting of water and a water-soluble organic solvent. It is preferable to use not general water which contains various kinds of ions but ion-exchanged water (deionized water).

As a water-soluble organic solvent which is to be used in the condition mixed with water, there can be mentioned, for example, an alkyl alcohol having 1 to 4 carbon atoms such as methyl alcohol, ethyl alcohol, n-propyl alcohol, isopropyl alcohol, n-butyl alcohol, sec-butyl alcohol, tert-butyl alcohol and the like; an amide such as dimethylformamide, dimethylacetamide and the like; a ketone or a keto alcohols such as acetone, diacetone alcohol and the like; an ether such as tetrahydrofuran, dioxane and the like; a polyalkylene glycol such as polyethylene glycol, polypropylene glycol and the like; an alkylene glycol which has an alkylene group containing 2 to 6 carbon atoms such as ethylene glycol, propylene glycol, butylene glycol, triethylene glycol, 1, 2, 6-hexanetriol, thiodiglycol, hexylene glycol, diethylene glycol and the like; glycerine; a lower alkyl ether of a polyhydric alcohol such as ethylene glycol monomethyl (or ethyl) ether, diethylene glycol methyl (or ethyl) ether, triethylene glycol monomethyl (or ethyl) ether; N-methyl-2-pyrrolidone, 2-pyrrolidone, 1, 3-dimethyl-2-imidazolidinon. Out of these large number of water-soluble organic solvents, polyhydric alcohols such as diethylene glycol and lower alkyl ethers of polhydric alcohols such as triethylene glycol monomethyl (or ethyl) ether are preferable.

A content of the water-soluble organic solvent mentioned above is generally within a range from 3 to 50% of a total weight of an ink, preferably within a range from 3 to 40% by weight. Further, water is to be used at a ratio of 10 to 90% of a total weight of an ink, preferably within a range from 30 to 80% by weight.

In order to obtain an aqueous ink which has desired physical properties, an ink which is to be used for the image forming process according to the present invention can contain optionally adequate amounts of a viscosity modifier, a surface-active agent, an anti-foaming agent, an antiseptic, an antioxidant and so on in addition to the components described above. Further, the ink may contain optionally the water-soluble dyes described above as color materials in addition to the pigments mentioned above.

To manufacture an ink to be used for the image forming process according to the present invention which has the composition described above, a pigment is first added to an aqueous medium which contains at least water, agitated and then dispersed by dispersing means described later and subjected optionally to centrifugal separation, thereby preparing a desired fluid dispersion. Then, a sizing and additive components which are adequately selected as described above are added to the fluid dispersion, and agitated to prepare an ink to be used for image forming process according to the present invention.

Any one of general dispersing apparatuses, for example, a ball mill, a roll mill and sand mill can be used to disperse the pigment mentioned above in an aqueous medium. Out of these dispersing apparatuses, it is preferable to use a high-speed type sand mill, for example, Super Mill, Sand Grinder, Bead Mill, Agitator Mill, Grain Mill, Dynou Mill, Pearl Mill or Cobol Mill (by trade names).

When an ink such as that described above is to be used for the ink-jet ejecting method, a pigment which has an optimum particle size distribution is adopted from a viewpoint of requirements for resistance to clogging and so on. A-pigment which has a desired particle size distribution can be obtained by reducing a size of grinding medium of a dispersing apparatus, enhancing a charging ratio of the grinding medium, prolonging a treatment time, slowing down an ejecting speed, classifying particles with a filter or a centrifuge after grinding or a combination of these techniques.

Further, an anionic surface-active agent or anionic macromolecular substance is usable as an anionic compound to be contained in an aqueous ink. The anionic compound is to be added at 0.05 to 10% by weight, preferably at 0.2 to 5% by weight.

Furthermore, it is preferable that the ink contains an amphoteric surface-active agent which has been adjusted to a pH level not exceeding an isoelectric point thereof. A preferable example of the anionic surface-active agent is any one of carboxylate type, esther sulfate type, sulfonate type and esther phosphate type surface-active agents which are generally used. Further, an example of the anionic polymer is an alkali-soluble resin, concretely sodium polyacrylate or a polymer partially copolymerized with acrylic acid, which is not limitative needless to say.

Figure 11A:
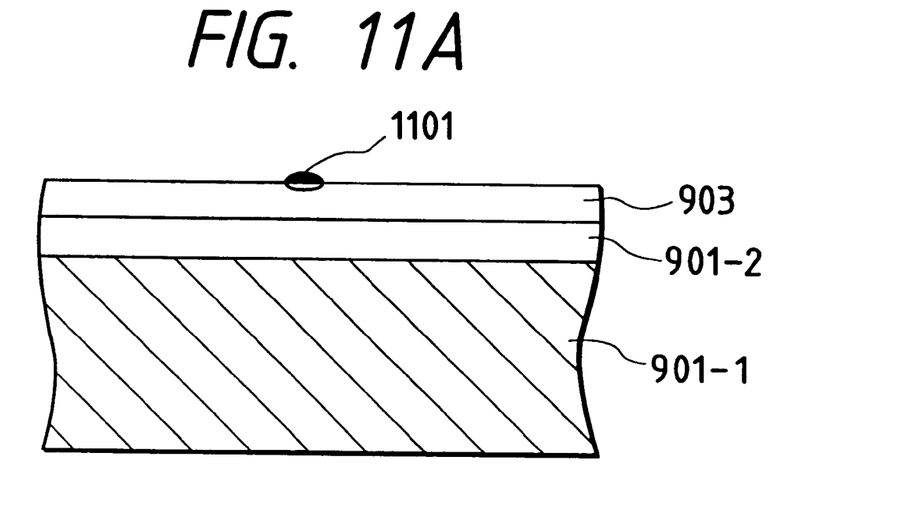
FIGS. 11A and 11B are diagrammatic descriptive view of the image forming process according to the present invention.
Figure 11B:
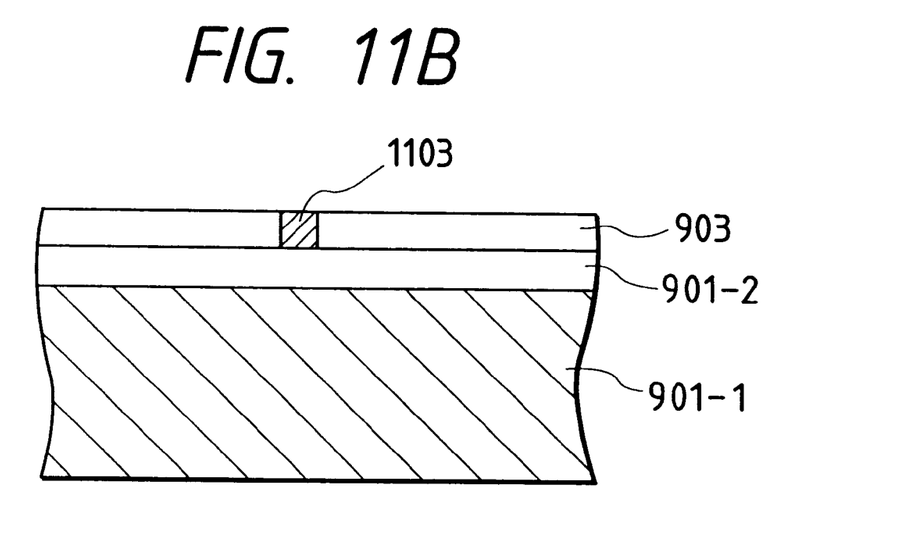

The image forming method according to the present invention forms an image by applying the aqueous ink described above to a recording medium by the ink-jet ejecting method such as that shown in FIGS. 11A and 11B, and heating it so as to transfer the pigment into the thermoplastic resin layer (1101 in FIGS. 11A, and 1103 in FIG. 11B). As a result, a transparent and lustrous image which is excellent in water resistance, fretting resistance and weather resistance is formed on the recording medium while making use of the merit of the pigment to provide excellent sharpness, color reproducibility and color density for images.

When a transparent polymer film is used as a substrate of a recording medium for the image forming process according to the present invention, an image is formed on a film which is completely transparent, whereby the image has excellent sharpness, color reproducibility, color density, water resistance, fretting resistance and weather resistance. The film is usable as an excellent original sheet for overhead projectors.

When a high grade printing paper such as a paper coated with a white pigment, a baryta paper, a resin-coated paper and the like or a photographic substrate is used as a substrate of the recording medium, an image which is formed by the ink-jet ejecting method is obtained as a lustrous film on an opaque substrate. As a result, the image forming process according to the present invention is capable of providing highly lustrous images which are excellent in color reproducibility, color density and resolution.

When a substrate having a silk-finish surface, a fine particle surface or the like which is known in the photographic field is used, obtained images have surfaces corresponding to that of the substrate. By pressing a surface of the top layer to an embossing surface after the top surface is softened or melted and before it is filmed by heating, it is possible to obtain an image which has an embossing surface corresponding to the embossing surface by the ink-jet ejecting method.

Figure 1:
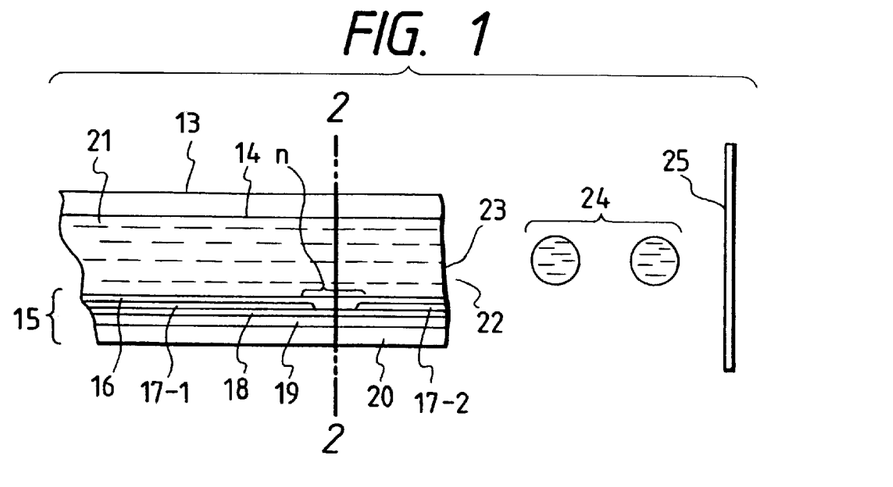
FIG. 1 is a vertical sectional view of a head section of an ink-jet recorder.
Figures 2, 3:
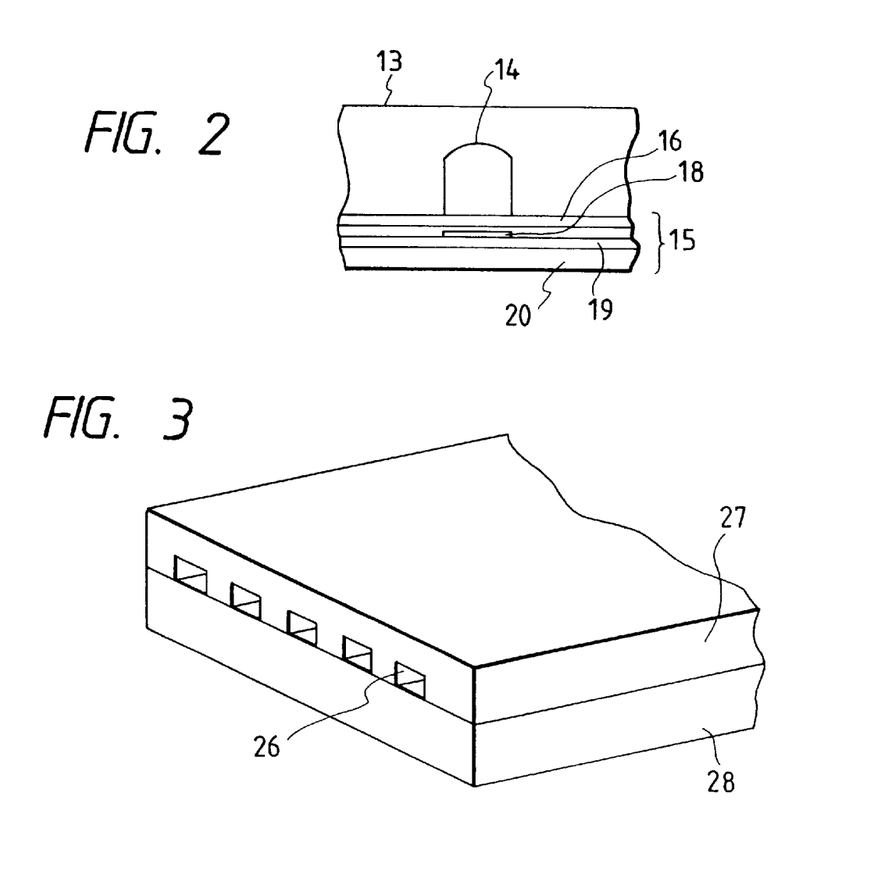
FIG. 2 is a cross sectional view of the head section of the ink-jet recorder.
FIG. 3 is an external perspective view of the head section of the ink-jet recorder.

Now, a description will be provided of a recorder which is employed in the ink-jet ejecting method according to the present invention described above. It is preferable to configure the recorder as a type which imparts recording signals to an ink reserved in a recording head and ejects liquid drops with a heat energy produced by the recording signals. A configuration of a recording head which is a main member of the recorder is illustrated in FIGS. 1, 2 and 3.

A head 13 is composed by cementing a glass, ceramic or plastic member which has a groove 14 for passing an ink to a heat generating head 15 which has an exothermic resistor used for thermographic recording (a thin-film head shown in the drawings is not limitative). The heat generating head 15 consists of a protective film 16 made of silicon oxide or the like, aluminium electrodes 17-1 and 17-2, an exthothermic resistor layer 18 made of nichrome or the like, a heat accumulating layer 19 and a substrate 20 which is made of a material such as alumina having high heat radiating property.

A recording ink 21 has attained to a ejecting orifice 22 and forms a meniscus 23 under a pressure P.

When an electric signal is applied to the aluminium electrodes 17-1 and 17-2, a region n of the heat generating head 15 which abruptly generates heat, air bubbles are produced in the ink 21 which is in contact with the region n and the meniscus 23 protrudes under a pressure of the air bubbles, whereby the ink 21 discharges while forming small drops 24 and jumps from the orifice 22 toward a recording medium 25.

FIG. 3 shows a schematic diagram of a recording head in which a nozzle shown in FIG. 1 is arranged in a large number. To make the recording head, the glass plate 27 having a large number of flow paths is adhered to the heat generating head 28 similar to that described in FIG. 1.

In connection with the above, FIG. 1 is a sectional view of the head 13 disposed along the ink flow path and FIG. 2 is a sectional view taken along an 2—2 line in FIG. 1.

Figure 4:
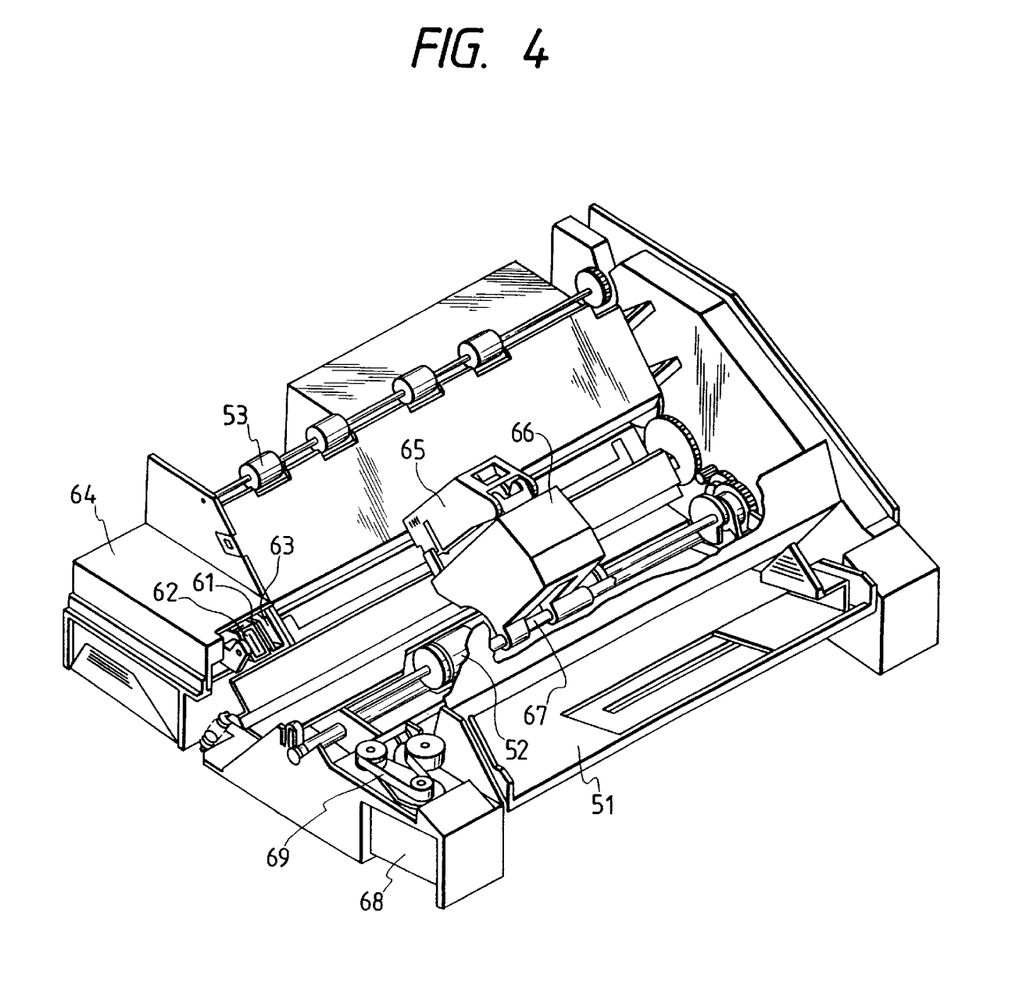
FIG. 4 is a perspective view exemplifying an ink-jet recorder.

FIG. 4 exemplifies an ink-jet recorder in which the recording head is assembled.

In FIG. 4, a reference numeral 61 represents a blade used as a wiping member, whose one end is fixed or held by a blade holding member so as to form a cantilever. The blade 61 is disposed at a location adjacent to a recording region for a recording head 65 and held in a protruding condition in a moving path of the recording head 65 in this embodiment.

A reference numeral 62 designates a cap for an ink ejecting port surface of the recording head 65 which is disposed at a home position adjacent to the blade 61 and configured to move in a direction perpendicular to a moving direction of the recording head 65 until it comes into contact with the ink ejecting port surface and functions as a cap. A reference numeral 63 denotes an ink absorber which is disposed at a position adjacent to the blade 61 and held, like the blade 61, in a protruding condition in the moving path of the recording head 65. The blade 61, the cap 62 and the ink absorber 63 compose a ejection recovery section 64, and the blade 61 and the ink absorber 63 remove water, dust, etc. from the surface of the ejecting port.

A reference numeral 65 represents a recording head which has ejection energy generating means and performs recording by ejecting an ink to a recording medium opposed to a ejecting port surface in which ejecting ports are arranged, a reference numeral 66 designates a carriage for moving the recording head 65 which is mounted thereon. The carriage 66 is slidably engaged with a guide shaft 67 and partially connected (not shown) to a belt 69 which is driven by a motor 68. Accordingly, the carriage 66 can move along the guide shaft 67 so as to move the recording head 65 within the recording region and adjacent regions.

A reference numeral 51 represents a paper feeder into which a recording medium is to be inserted and a reference numeral 52 designates a paper feeding roller which is driven by the motor 68. This configuration allows the recording medium to be fed to a location opposite to the ink ejecting port surface of the recording head 65 and discharged into a discharged paper section in which a paper discharge roller 53 is arranged as the recording progresses.

While the recording head 65 returns to its home position in the configuration described above upon termination of recording or a similar stage, the cap 62 of the ejection recovery section 64 retreats from the moving path of the recording head 65, but the blade 61 protrudes into the moving path. As a result, the blade 61 wipes the ejecting port surface of the recording head 65. When the cap 62 is contacted with the ejecting port surface of the recording head 65 for capping, the cap 62 is moved so as to protrude into the moving path of the recording head 65.

When the recording head 65 is to move from the home position to a recording start position, the cap 62 and the blade 61 are located at the positions which are the same as those at the wiping time. As a result, the ejecting port surface of the recording head 65 is wiped also during the movement of the recording head 65.

The recording head 65 moves to the home position not only upon termination of recording and a ejection recovery time but it moves to the home position adjacent to the recording region at predetermined intervals also while it is moving within the recording region for recording, whereby the recording head 65 is also wiped along with the movements.

Figure 5:
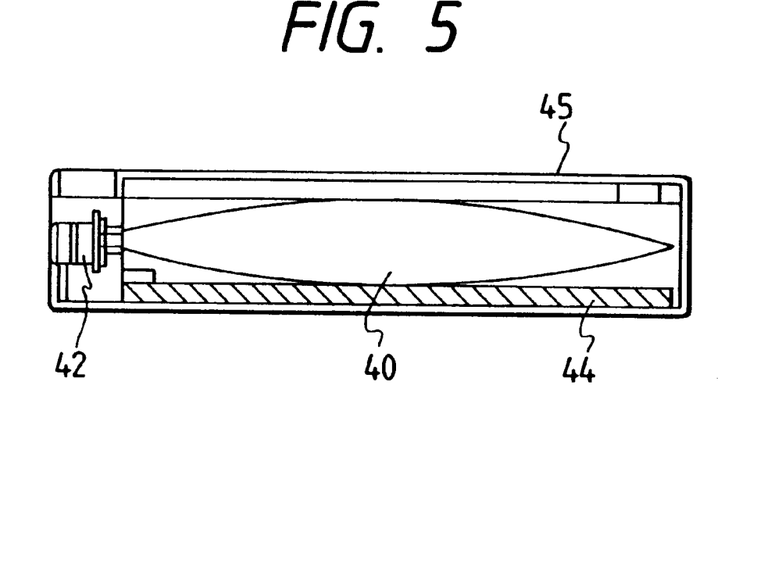
FIG. 5 is a longitudinal sectional view of an ink cartridge.

FIG. 5 is a diagram exemplifying an ink cartridge 45 which accommodates an ink supplied to the head by way of an ink supply member, for example, a tube. A reference numeral 40 represents an ink reservoir, for example, an ink bag, which accommodates the supplied ink and has a rubber stopper 42 at its tip. When a needle (not shown) is inserted into the stopper 42, the ink can be supplied from the ink bag 40 to the head. A reference numeral 44 designates an ink absorber which receives waste ink.

It is preferable to use an ink reservoir having a liquid contact surface to be brought into contact with the ink which is made of polyolefine, in particular, polyethylene.

Figure 6:
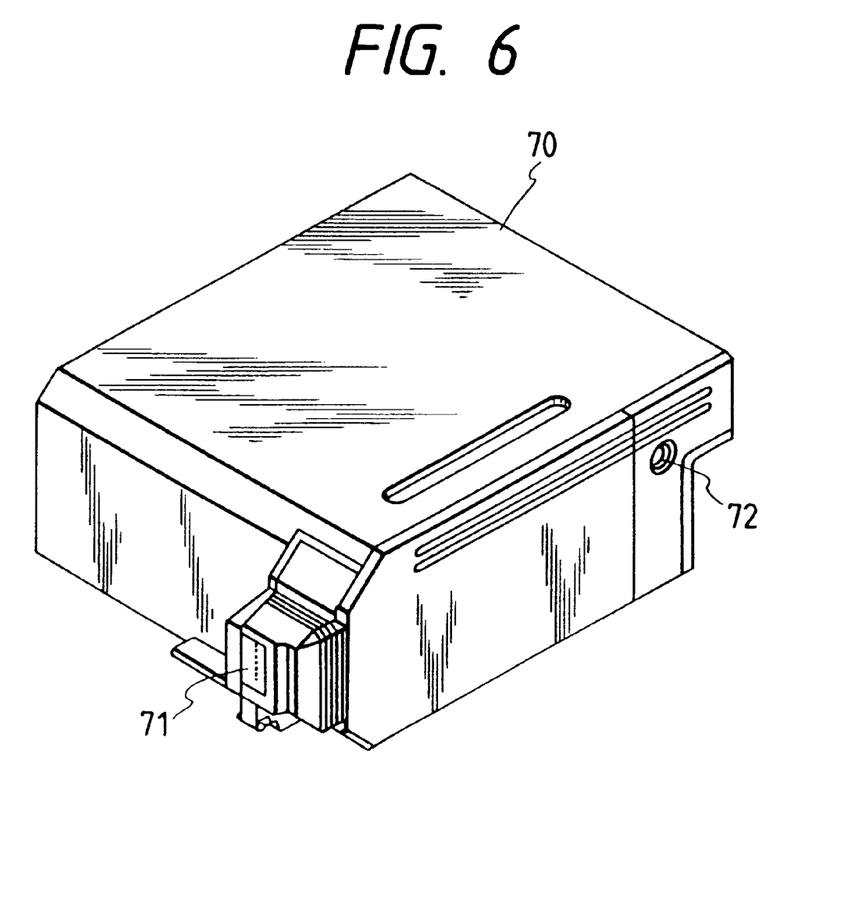
FIG. 6 is a perspective view of a recording unit.

Not only the ink-jet recorder consisting of the head and the ink cartridge which are configured separately as described above but also a recorder consisting of a head and an ink cartridge which are integrated with each other is preferably usable to carry out the image forming process according to the present invention as shown in FIG. 6.

In FIG. 6, a reference numeral 70 represents a recording unit which accommodates an ink reservoir, for example an ink absorber, which reserves an ink and is configured so as to allow the ink reserved in the ink absorber to be ejected as ink drops from a head 71 having a plurality of orifices. Polyurethane, for example, can be used as a material of the ink absorber. A reference numeral 72 designates an atmosphere communication port for communicating an interior of the recording unit with atmosphere. The recording unit 70 which is used in place of the recording head shown in FIG. 4 is freely attachable to and detachable from the carriage 66. Though the ink-jet recorder which is configured to eject the ink drops by exerting the heat energy to the ink as been described above as a recorder to carry out the image forming process according to the present invention, it is also possible to utilize a piezoelectric type ink-jet recorder which uses a piezoelectric element.

Figure 7:
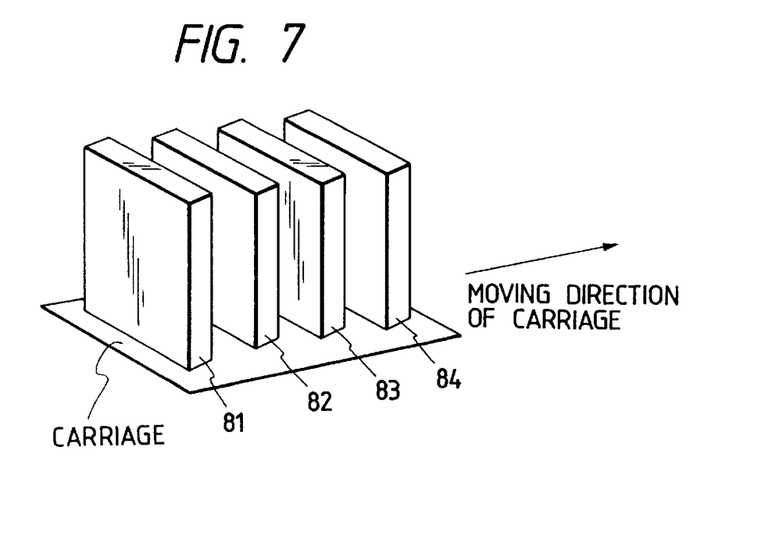
FIG. 7 is a perspective view of a recording section wherein a recording head which is used in an embodiment of the present invention is arranged in a plurality.
Figure 8:
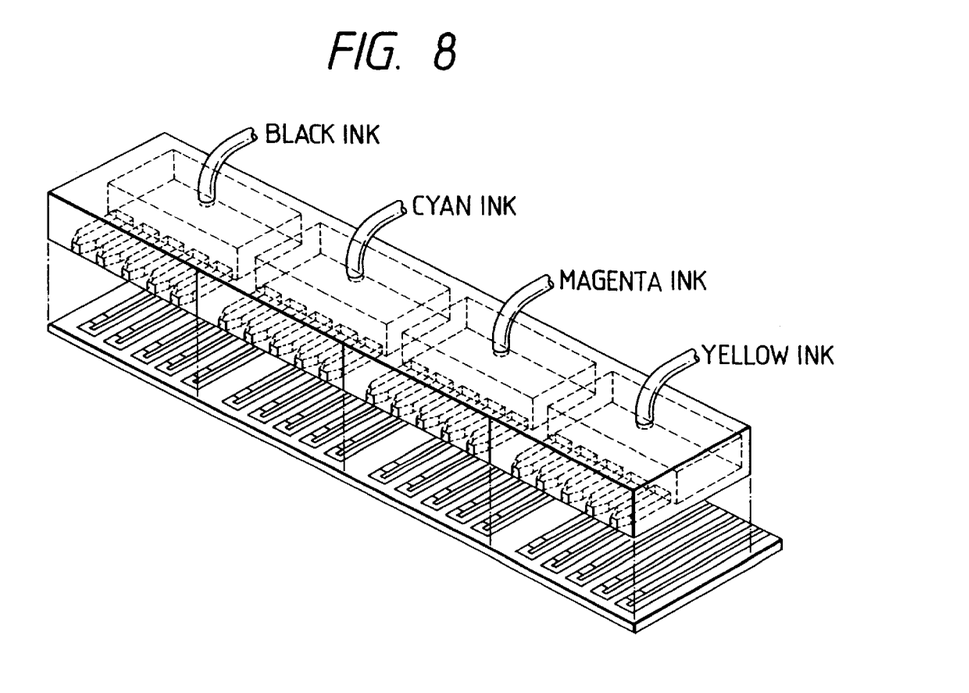
FIG. 8 is a perspective view of another recording head to be used for the image forming process according to the present invention.

A recorder in which four recording heads shown in FIG. 3 are arranged on a carriage, for example, is used to carry out the image forming method according to the present invention. FIG. 7 shows an example of such a recorder. Reference numerals 81, 82, 83 and 84 represent recording heads which eject yellow, magenta, cyanic and black recording inks respectively. These heads are arranged in the recorder described above and eject the recording inks of different colors in accordance with recording signals. Though the four heads are arranged in the example shown in FIG. 7, this configuration is not limitative, and it is preferable to form separate liquid flow paths for yellow, magenta, cyanic and black inks in a single recording head as shown in FIG. 8.

The present invention will be described more concretely with reference to preferred embodiments of the present invention, wherein "part" and "%" are to be taken as weight standards unless otherwise specified.

EXAMPLES 1 to 3

Images were formed and evaluated through steps a to c which are described below:

(a. Manufacturing of recording medium)

A coating liquid was prepared by adding 45 parts of water to 5 parts of polyvinyl alcohol adopted as an adhesive agent and further adding 50 parts of latex containing the thermoplastic resin particles listed in Table 1. This coating liquid was applied to Transparency Film CF-301 prepared by Canon Inc. so as to obtain 5 g/m$^2$ of solid matter. Recording medium having thermoplastic resin particle layers 5 μm thick which were formed as top layer on ink receiving layers were manufactured by heating substrates at 70° C.

TABLE 1

Thermoplastic Resin Particles Used in Examples

| | Thermoplastic resin particle | | Mean particle |
| --- | --- | --- | --- |
| | Name | Manufacturer | diameter |
| Example 1 | Styrene-butadiene type latex (Trade name: Nipol LX303; Tg = 100° C.) | Nippon Zeon | 0.16 μm |
| Example 2 | (Trade name: Chemi-Pearl S-300; Tg = 94° C.) | Mitsui Petrochemical Industries, Ltd. | 0.5 μm |
| Example 3 | (Trade name: Chemi-Pearl W-100; Tg = 115° C.) | Mitsui Petrochemical Industries, Ltd. | 3 μm |

(b. Preparation of Inks)

CAB-O-JET 200 and CAB-O-JET 300 (trade names; prepared by Cabot Co., Ltd.) were prepared as pigment dispersing materials containing pigments which can be dispersed in water without a dispersing agent. CAB-O-JET 200 is a pigment dispersing material at pH 7.8 containing a self-dispersion type carbon black (mean particle diameter 130 nm) which has a sulfone group on a surface thereof and is dispersed at a ratio of 20 % by weight.

Further, CAB-O-JET 300 is a pigment dispersing material at pH 7.8 containing a self-dispersion type carbon black (mean particle diameter 150 nm) which has a carboxyl group on a surface thereof and is dispersed at a ratio of 15% by weight. Using these pigment dispersing materials, inks having compositions shown in Table 2 below were prepared. Each of the inks was manufactured by mixing components and agitating them for 12 hours with a stirrer.

TABLE 2

Compositions of Inks Used in Examples 1 to 3

| Composition of ink | Example 1 | Example 2 | Example 3 |
|---|---|---|---|
| Cabojet 200 | 20 wt % | 15 wt % | — |
| Cabojet 300 | — | — | 3 wt % |
| C.I. Food Black 2 | — | 1 wt % | 1.2 wt % |
| Diethylene glycol | 9 wt % | — | 7 wt % |
| Ethylene glycol | — | 12 wt % | — |
| Glycerine | 8 wt % | 10 wt % | 9 wt % |
| Ethanol | 4 wt % | 6 wt % | — |
| Isopropyl alcohol | — | — | 5 wt % |
| Water | Rest wt % | Rest wt % | Rest wt % |

(c. Image formation and evaluation)

Using the recording medium obtained at the step a) and aqueous inks prepared at the step b), images were formed with Printer BJC-400J manufactured by Canon Inc. 30 minutes after forming the images, top layers of the recording medium were heated to temperatures specified in Table 3 and maintained at these temperatures for 20 minutes to form the images.

Then, fretting resistance and water resistance of the images thus obtained were evaluated by the procedures and according to evaluation standards which are described below. The results are shown in Table 3.

Evaluation standards (1) Fretting resistance

Images, monochromatic images and alphanumerics were rubbed with dry tissue papers. No adhesion of color materials contained in inks to the tissue papers was evaluated as o, whereas adhesion of the color materials to the tissue papers was evaluated as x.

(2) Water resistance

Images, monochromatic images and alphanumerics which were formed on the recording medium through the steps described above were left standing for one hour in atmosphere at room temperature and then submerged for 10 seconds in city water at 20° C. The images were taken out of the water, air-dried and visually checked for water resistance. Evaluation standards were:

⊚: Pigment or dye did not flow into blanks and base surfaces of recording medium were scarcely fouled. The alphanumerics are scarcely blurred.

o: Pigment or dye scarcely flowed into blanks and base surfaces of recording medium were scarcely fouled. The alphanumerics were slightly blurred but the blurring is not problematic for practical use.

x: Pigment or dye scarcely flowed into blanks and base surfaces of the recording medium were scarcely fouled. The alphanumerics were rather blurred and problematic for practical use.

TABLE 3

Medium Heating Temperatures and Image Evaluation Results

| | Medium heating temperature | Fretting resistance | Water resistance |
|---|---|---|---|
| Example 1 | 110° C. | o | ⊚ |
| Example 2 | 140° C. | o | ⊚ |
| Example 3 | 135° C. | o | ⊚ |

COMPARATIVE EXAMPLE 1

[Preparation of black ink]

| Macromolecular dispersing agent* | 40 parts |
|---|---|
| Carbon black | 24 parts |
| (Trade name: MA100: prepared by Mitsubishi Chemical Industries, Ltd.) | |
| Ethylene glycol | 20 parts |
| Water | 16 parts |

*Macromolecular dispersing agent: Aqueous solution of anionic polymer (an aqueous solution of styrene-methacrylic acid-ethyl acrylate: acid value 400, weight-average molecular weight 6000, solid matter 20% by weight, neutralizing agent: (monoethanolamine)

The materials mentioned above were put together with glass beads having a diameter of 1 mm into a vertical type batch sand mill (manufactured by Imex Co.) and treated for three hours while cooling with water. After dispersion, the liquid had a viscosity of 9 cps and a pH value of 10. This liquid was centrifugalized with a centrifugal separator to remove coarse particles, thereby obtaining a black ink containing a dispersing agent which had a mean particle diameter of 135 m$\mu$ and a solid matter of 13%.

Images were formed in the same procedures as those for Example 1 (medium heating temperature: 110° C.), except for use of the ink which is manufactured as described above. Observation of the recorded images indicated that a pigment adhering to a surface of a recording medium did not transfer sufficiently into a thermoplastic resin layer. Further, the images did not exhibit sufficiently high fretting resistance.

As understood from the foregoing description, the present invention provides an image forming process by a convenient ink-jet recording method which is capable of forming sharp images having high fretting resistance and water resistance even on substrates which have low ink absorptivities.

What is claimed is:

1. An image forming process comprising steps of:

(i) providing a recording medium having a substrate and a thermoplastic resin layer which constitutes an outermost layer of said recording medium;

(ii) ejecting an aqueous ink containing a pigment capable of being dispersed in water without a dispersing agent toward an outside surface of the thermoplastic resin layer by employing an ink-jet ejecting method, thereby attaching the pigment onto the outside surface of the thermoplastic resin layer; and (iii) transferring the pigment from the outside surface of the thermoplastic resin layer into the thermoplastic resin layer by heating the recording medium.

2. The image forming process according to claim 1, wherein said step (iii) is performed after step (ii).

3. The image forming process according to claim 1, wherein said thermoplastic resin layer is a porous layer.

4. The image forming process according to claim 3, wherein said thermoplastic resin layer contains thermoplastic resin particles.

5. The image forming process according to claim 1, wherein said pigment capable of being dispersed in water without said dispersing agent is a carbon black having a modified surface.

6. The image forming process according to claim 5, wherein the carbon black having a modified surface is a carbon black of which a hydrophilic group is bound for the surface thereof directly or through an atomic group.

7. The image forming process according to claim 6, wherein said hydrophilic group is at least one group selected from a group consisting of those which are listed below:

wherein M represents a hydrogen atom, an alkali metal, an ammonium or a quaternary ammonium, R designates a straight-chain or branched-chain alkyl group having 1 to 12 carbon atoms, a substituted or unsubstituted phenyl group or a substituted or unsubstituted naphthyl group.

8. The image forming process according to claim 6, wherein the atomic group is an alkylene group having 1 to 12 carbon atoms, a substituted or unsubstituted phenylene group or a substituted or unsubstituted naphthylene group.

* * * * *

UNITED STATES PATENT AND TRADEMARK OFFICE
CERTIFICATE OF CORRECTION

PATENT NO. : 6,367,921 B1
DATED : April 9, 2002
INVENTOR(S) : Yutaka Kurabayashi et al.

It is certified that error appears in the above-identified patent and that said Letters Patent is hereby corrected as shown below:

Column 1,
Line 62, "ink- receiving" should read -- ink-receiving --.

Column 3,
Line 5, "being" should read -- is --; and
Line 39, "view" should read -- views --.

Column 4,
Line 40, "agent," should read -- agents, --.

Column 7,
Line 29, "cationinally" should read -- cationically --; and
Line 65, "an" should be deleted.

Column 8,
Line 19, "general" should read -- typical --; and
Line 21, "are put" should be deleted.

Column 9,
Line 34, "groups" should read -- group --;
Line 45, "combination" should read -- combination of --; and
Line 57, "conditions" should read -- condition --.

Column 10,
Line 33, "alcohols" should read -- alcohol --;
Line 46, "these" should read -- this --; and
Line 48, "polhydric" should read -- polyhydric --.

Column 11,
Line 4, "a sizing" should read -- sizing --;
Line 5, "adequately" should read -- appropriately --;
Line 20, "A-pigment" should read -- A pigment --;
Lines 36 and 37, "esther" should read -- ester --.

Column 12,
Line 27, "exthothermic" should read -- exothermic --; and
Line 32, "a ejecting" should read -- an ejecting --.

UNITED STATES PATENT AND TRADEMARK OFFICE
CERTIFICATE OF CORRECTION

PATENT NO. : 6,367,921 B1
DATED : April 9, 2002
INVENTOR(S) : Yutaka Kurabayashi et al.

It is certified that error appears in the above-identified patent and that said Letters Patent is hereby corrected as shown below:

<u>Column 13,</u>
Line 1, "a ejection" should read -- an ejection --;
Line 6, "to a" should read -- to an --;
Line 40, "a ejection" should read -- an ejection --; and
Line 57, "polyolefine," should read -- polyolefin, --.

<u>Column 14,</u>
Line 9, "been" should read -- has been --.

<u>Column 17,</u>
Line 12, "bound for" should read -- bound to --.

Signed and Sealed this

Twenty-fifth Day of March, 2003

JAMES E. ROGAN
*Director of the United States Patent and Trademark Office*